(12) United States Patent
Ralev

(10) Patent No.: US 8,341,294 B2
(45) Date of Patent: Dec. 25, 2012

(54) MECHANISM FOR COOPERATIVE LOAD BALANCING WITH HTTP IN CONVERGED TELECOMMUNICATION SERVICES

(75) Inventor: Vladimir Ralev, Bourgas (BG)

(73) Assignee: Red Hat, Inc., Raleigh, NC (US)

( * ) Notice: Subject to any disclaimer, the term of this patent is extended or adjusted under 35 U.S.C. 154(b) by 135 days.

(21) Appl. No.: 12/787,218

(22) Filed: May 25, 2010

(65) Prior Publication Data

US 2011/0295927 A1 Dec. 1, 2011

(51) Int. Cl.
*G06F 15/173* (2006.01)
*G06F 15/16* (2006.01)

(52) U.S. Cl. ......... 709/243; 709/239; 709/204; 709/205

(58) Field of Classification Search ................. None
See application file for complete search history.

(56) References Cited

U.S. PATENT DOCUMENTS

| 6,775,687 B1 * | 8/2004 | Binding et al. | 709/203 |
| 2006/0233106 A1 * | 10/2006 | Achlioptas et al. | 370/235 |
| 2008/0288644 A1 * | 11/2008 | Gilfix et al. | 709/227 |

OTHER PUBLICATIONS

Mobicents, "Mobicents Load Balancing", Design documentation, Revised: Mar. 4, 2010, 39 pages.

* cited by examiner

*Primary Examiner* — Scott Christensen
(74) *Attorney, Agent, or Firm* — Lowenstein Sandler PC

(57) ABSTRACT

A mechanism for cooperative load balancing with HyperText Transport Protocol (HTTP) in converged telecommunication services is disclosed. A method of the invention includes receiving an incoming HyperText Transport Protocol (HTTP) request, determining that the HTTP request does not belong to a server machine node that received the HTTP request, updating a hints field included with the HTTP request with identifying information of the server machine node, selecting another server machine node of the cluster of server machine nodes that is not listed in the hints field to place in a route field included with the HTTP request, and sending a redirection response with the updated hints and updated route fields to a client machine.

20 Claims, 5 Drawing Sheets

400

```
┌─────────────────────────────────────────────────────────────────┐
│           Receive incoming HTTP Request from client             │
│                                                            410  │
└─────────────────────────────────────────────────────────────────┘
                              │
                              ▼
┌─────────────────────────────────────────────────────────────────┐
│ Determine a node to route the HTTP request to by referencing a  │
│              route field in a cookie of the request             │
│                                                            420  │
└─────────────────────────────────────────────────────────────────┘
                              │
                              ▼
┌─────────────────────────────────────────────────────────────────┐
│              Route HTTP request to the determined node          │
│                                                            430  │
└─────────────────────────────────────────────────────────────────┘
                              │
                              ▼
┌─────────────────────────────────────────────────────────────────┐
│ Receive redirected form of HTTP request from client, including  │
│ an updated hints field in the cookie listing any nodes that     │
│ have rejected the HTTP request                                  │
│                                                            440  │
└─────────────────────────────────────────────────────────────────┘
                              │
                              ▼
┌─────────────────────────────────────────────────────────────────┐
│ Determine a node to route the redirected HTTP request to by     │
│ referencing the route field in the cookie of the request that   │
│ has been updated by the previous node the rejected the request  │
│                                                            450  │
└─────────────────────────────────────────────────────────────────┘
                              │
                              ▼
┌─────────────────────────────────────────────────────────────────┐
│         Route redirected HTTP request to the determined node    │
│                                                            460  │
└─────────────────────────────────────────────────────────────────┘
```

*Fig. 4*

MECHANISM FOR COOPERATIVE LOAD BALANCING WITH HTTP IN CONVERGED TELECOMMUNICATION SERVICES

TECHNICAL FIELD

The embodiments of the invention relate generally to converged telecommunication services and, more specifically, relate to a mechanism for cooperative load balancing with HyperText Transport Protocol (HTTP) in converged telecommunication services.

BACKGROUND

Many telecommunications services now use a variety of protocols (e.g., Session Initiation Protocol (SIP), HyperText Transport Protocol (HTTP), Real-time Transport Protocol (RTP), and so on) to build rich services in terms of "converged applications". One example of a converged application is a web conference. The participants in the web conference may connect over the telephone to hear each other, but will also connect via the web to visualize who is attending the conference and view materials related to the conference or perform operations such as conference moderation, muting users, or removing users.

The clustering of these services into a host server environment introduces new challenges. Clustering is the concept of utilizing many host servers in a cluster to serve the requests of multiple users. When applications are hosted by a cluster, it is efficient to have the various sessions from each protocol utilized in the converged application hosted by the same node in the cluster. A specific challenge of clustering in the converged application context is how to handle the load balancing of HTTP requests when a converged application session has failed.

For example, assume a node in a cluster is serving converged application sessions of HTTP and SIP protocols and that this node fails for any variety of reasons. At this point, the sessions will get routed according to their separate protocols. Requests related to the session and directed to the cluster will be distributed by a load balancer assigned for the particular protocol. In out example, SIP requests will be directed through a SIP load balancer and HTTP requests will be directed through an HTTP load balancer. These load balancers do not communicate with each other. As a result, they will not take into consideration that the request may be part of a converged application, and will not look to direct a request to a node that is serving any related protocol sessions for the request. In other words, the protocol session will be failed-over independently to different cluster nodes. This is not an efficient result. Hosting related protocol sessions of a converged application on the same node is ideal as it saves valuable time and processing resources.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 4 is a flow diagram illustrating a method performed by a load balancer for cooperative load balancing with HTTP in converged telecommunication services according to an embodiment of the invention.

DETAILED DESCRIPTION

Figure 1:
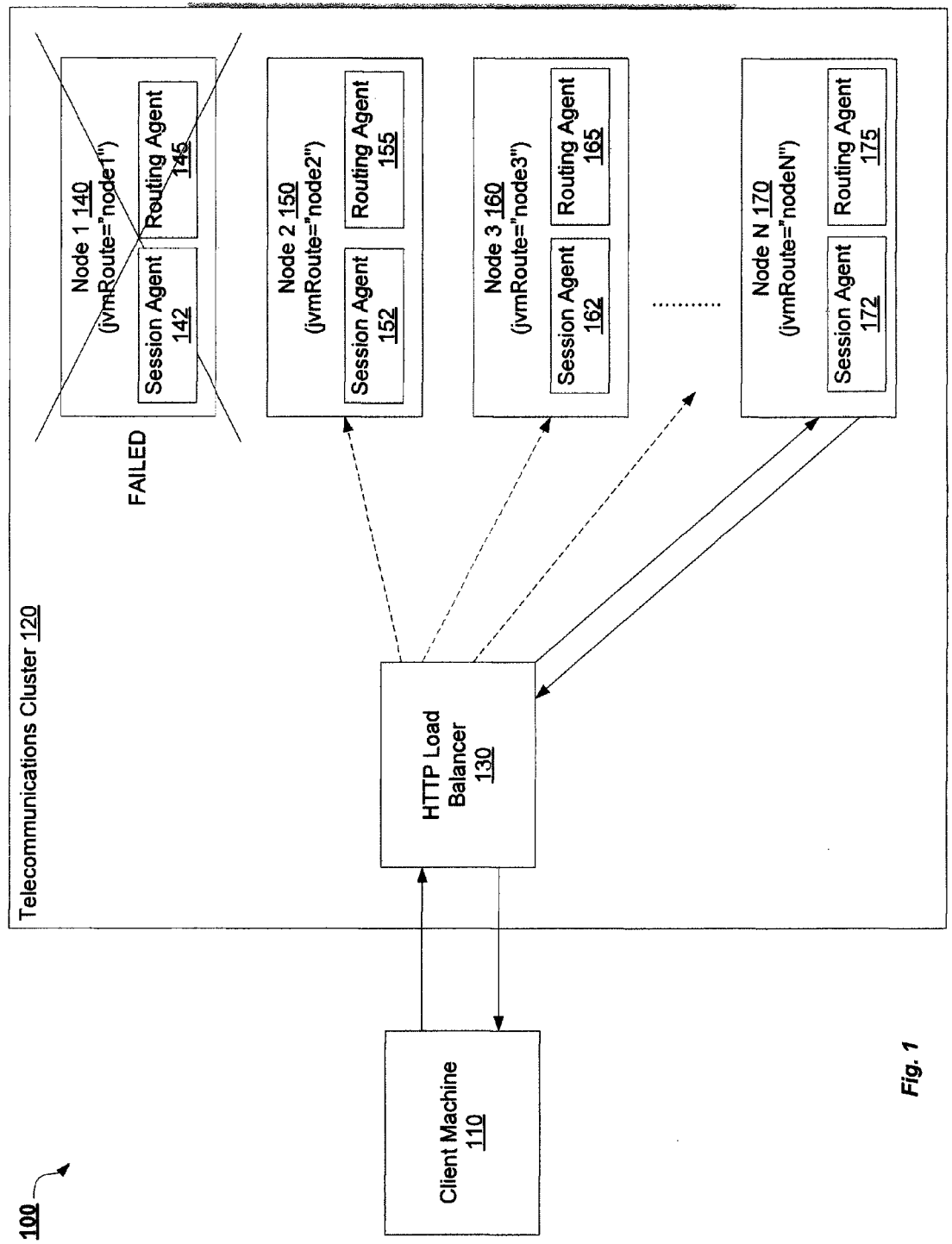
FIG. 1 is a block diagram of a telecommunications system performing cooperative load balancing with HyperText Transport Protocol (HTTP) according to an embodiment of the invention.

Embodiments of the invention provide a mechanism for cooperative load balancing with HyperText Transport Protocol (HTTP) in converged telecommunication services. A method of embodiments of the invention includes receiving an incoming HyperText Transport Protocol (HTTP) request, determining that the HTTP request does not belong to a server machine node that received the HTTP request, updating a hints field included with the HTTP request with identifying information of the server machine node, selecting another server machine node of the cluster of server machine nodes that is not listed in the hints field to place in a route field included with the HTTP request, and sending a redirection response with the updated hints and updated route fields to a client machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "updating", "selecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for cooperative load balancing with HTTP in converged telecommunication services. When a converged telecommunication session fails at a node in cluster of nodes, the HTTP session is failed over separately from any other protocol sessions in the converged application, without reference to where each individual converged application session is being hosted. Each node in the cluster has knowledge of the other operating nodes, but does not know which node is hosting which protocol's session. Furthermore, it is assumed that the decision where the HTTP session and other sessions are failed-over is made by independent load balancers with no direct coordination.

To aid in making sure that the HTTP session ends up being served at the same node as other protocol sessions of the converged application, any HTTP requests are sent with cookies that include a 'jvmRoute' field and a 'rejectedBy' field (each configurable). In some embodiments, the 'jvmRoute' and 'rejectedBy' fields may be HTTP GET parameters instead of cookies. Generally, HTTP load balancers, such as mod_jk, mod_proxy, and mod_cluster, are aware of the 'jvmRoute' field and will direct the requests to the node specified in this fields. On the other hand, the load balancers are not aware of the 'rejectedBy' field.

The 'rejectedBy' field lists all nodes that the request has been previously sent to that did not hold the other converged application protocol session. If a node receives the request and is not hosting other converged application protocol sessions, then it updates the 'rejectedBy' field with the node information and redirects the HTTP request via the 'jvmRoute' field to another node that is not listed in the 'rejectedBy' field. In this way, non-determinism in routing the HTTP request is removed and the request can find its way to the node hosting the other converged application protocol sessions faster. Embodiments of the invention may also work with other protocols, not only SIP, including Session Initiation Protocol (SIP), Extensible Messaging and Presence Protocol (XMPP), Short Messaging Peer-to-Peer Protocol (SMPP), Diameter, Real-time Transport Protocol (RTP), and Signaling System #7 (SS7), HTTP itself, and other protocols based in telecommunications.

FIG. 1 is a block diagram of a telecommunications system 100 performing cooperative load balancing with HTTP according to an embodiment of the invention. Telecommunications system 100 includes a client machine 110 communicably coupled to a cluster of nodes 120. Client machine 110 and cluster 120 may be directly connected or may be communicably coupled via a network (not shown). The network may be a private network (e.g., a local area network (LAN), wide area network (WAN), intranet, etc.) or a public network (e.g., the Internet). In one embodiment, client 110 includes a browser application that is capable of sending HTTP and other telecommunication protocol requests.

In one embodiment, cluster 120 includes a plurality of nodes 140, 150, 160, 170 and an HTTP load balancer 130. In one embodiment, the HTTP load balancer 130 may be a separate computing device communicably coupled to nodes 140-170, or may be part of a gateway server device (not shown) providing various routing functions related to nodes 140-170. In one embodiment, the HTTP load balancer 130 may be a mod_jk, mod_proxy, mod_cluster, or other load balancer aware of 'jvmRoute' or similar field. Nodes 140-170 may be server machines hosting data services, such as HTTP sessions and other telecommunication protocol sessions. For example, nodes 140-170 may be web hosting servers providing web page data. There is no limit for how many nodes may be served in the cluster 120. Cluster 120 may include other components, such as load balancers dedicated to protocols other than HTTP.

Embodiments of the invention provide a solution for load balancing the HTTP portion of the converged session so that failed over HTTP requests of the converged session arrive at the same node servicing other protocol sessions of the converged session. When a converged session in the cluster 120 fails because a node 140-170 has gone down, embodiments of the invention utilize the HTTP load balancer 130 to aid in synchronizing the converged session protocols in a single node 140-170.

The HTTP load balancer 130 is used (versus other protocol load balancers) because the HTTP protocol utilizes cookies. Cookies allow for the storage of state in messages. As a result, neither the load balancer 130 nor the individual node 140-170 has to remember state; only the client 110 remembers the state and includes this in a cookie each time it makes a HTTP request. In addition, as neither the load balancer 130 nor the cluster nodes 140-170 have to maintain state, it does not need to be replicated around the cluster 120, reducing the amount of coordination required between nodes 140-170.

In embodiments of the invention, when a converged session is failed over, the HTTP session and the other protocol sessions are separately and individually routed to different cluster nodes 140-170 that are not necessarily the same (unsynchronized). Each individual cluster node 140-170 is aware of the other protocol sessions being served on its own node, but is not aware of what protocol sessions are served on the other nodes 140-170 in the cluster 120. The HTTP load balancer 130 will make routing decisions for any HTTP requests for the HTTP failover, and other protocol load balancers (not shown) in the cluster 120 will make the routing decisions for the other protocol requests from the fail over. These separate load balancers cannot communicate with each other and will not know the decisions made by each other.

When an HTTP request arrives at the load balancer 130 from the failed over session at node 1 140 for the first time, the load balancer 130 will make a random decision as to which node 150, 160, 170 to route the request. Each node 140-170 may include a 'jvmRoute' property that is essentially the address of the node or a reference to the address of the node. Each HTTP request includes this 'jvmRoute' field in a cookie of the request, which ensures that each subsequent HTTP request from the same client always hits the same node 140-170. If 'jmvRoute' field is missing, the load balancer 130 may send the request to a random node and this node will set the 'jvmRoute' field for the subsequent requests. When the initial post-failover HTTP request arrives at the load balancer 130, the 'jvmRoute' field will be randomly assigned by the load balancer 130 from the known active and running nodes 150-170 in the cluster.

In embodiments of the invention, when a session agent 142 of the cluster node 140-170 sees that an HTTP session should not be assigned to it, that cluster node 140-170 will send an HTTP redirect response to the client via a routing agent 145, 155, 165, 175 on the node 140-170. An HTTP redirect response is an instruction for the client (e.g., browser) to send a new HTTP request to a different node. Embodiments of the invention will also send additional hints in the cookie of the request of where the request should not be routed next time. In one embodiment, these additional hints are stored in a 'rejectedBy' field in the cookie of the request. This 'rejectedBy' field is a list of all nodes that have received and rejected the HTTP request so far. In some embodiments, this 'rejectedBy' field may also be referred to as a hints field.

When other nodes 140-170 see the hints in the 'rejectedBy' field, they will know not to use any of the listed nodes in the redirect request. As a result, the routing agent 145 of nodes 140-170 can make much better decisions and eventually find the right cluster node 140-170 for the HTTP request. This avoids the problem of non-determinism, or in other words, repeatedly sending the HTTP request to the same nodes 140-170 without ever finding the real node. Embodiments of the invention avoid this random selection of nodes problem and the potential to fall into a never-ending loop.

One skilled in the art will appreciate that the 'jvmRoute' and 'rejectedBy' fields of the HTTP request are configurable and may be identified by other names or part of other formats. Embodiments of the invention are not limited to these particular fields and may be implemented in a variety of means that accomplish the same purposes as stated above.

Figure 2:
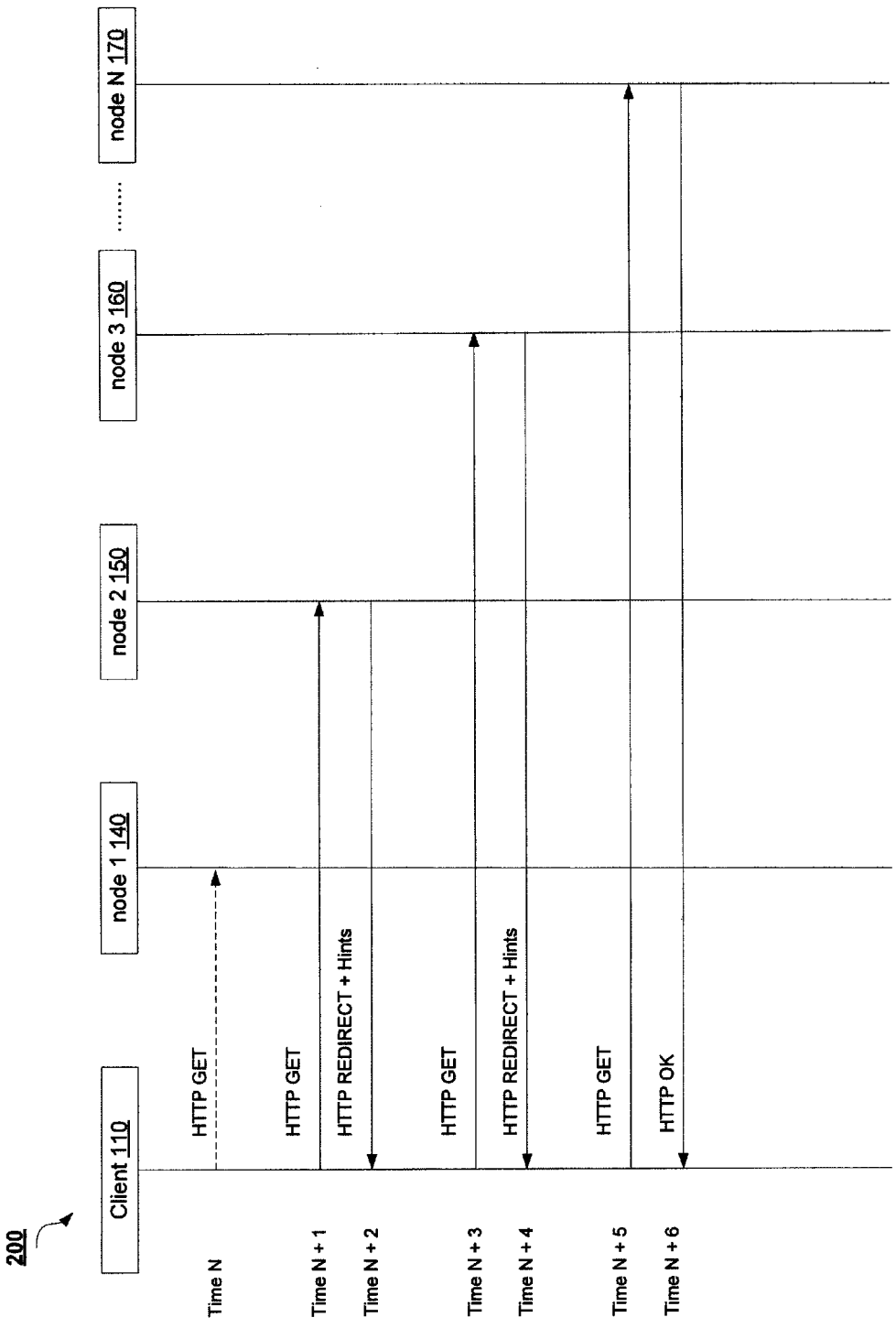
FIG. 2 is a block diagram of a timeline of a telecommunications system performing cooperative load balancing with HTTP according to an embodiment of the invention.

FIG. 2 is a block diagram of a timeline 200 of a telecommunications system performing cooperative load balancing with HTTP according to an embodiment of the invention. In one embodiment, timeline 200 depicts an exemplary sequence of events occurring between client 110 and nodes 140-170 of FIG. 1. The timeline 200 is described further below in conjunction with the components of FIG. 1

With respect to FIG. 1, assume that node 1 140 of the cluster 120 is hosting a converged telecommunication session, with one of the protocols of the converged session being HTTP. For any of a variety of reasons, this node 1 140 fails at time N. In addition, assume that the other protocol sessions of the failed-over converged session have been routed to node N 170.

As illustrated, the load balancer 130 assigns the initial post-failover HTTP request to node 2 150 and updates the 'jvmRoute' field of the cookie of the request with this information. The load balancer 130 then routes the request to this randomly-assigned node 150 at time N+1. When the HTTP request arrives at node 2 150, node 2 150 has a session agent 152 and a routing agent 155 that can determine that the request does not belong to the node 150. In this case, the node 2 150 will update the 'jvmRoute' with another node 140-170, that is active in the cluster 120, namely node 3 160. As part of update, the node 2 150 also updates the 'rejectedBy' field of the cookie of the request with its identifying information and sends the request back to the client machine 110 for purposes of sending out a new HTTP request at time N+2.

When the new redirected HTTP request is received from the client 110, the load balancer 130 then routes the request to node 3 160 as determined from the 'jvmRoute' of the HTTP request at time N+3. Node 3 160, and more specifically session agent 162, then determines that the converged session is not being hosted at this node 160. As a result, the session agent 162 of node 3 160 updates the 'rejectedBy' field with its own identifying information. The session agent 162 of node 3 160 will also update the 'jvmRoute' field for the redirect request by referencing the hints found in the 'rejectedBy' field. The 'rejectedBy' field eliminates node 2 150 and node 3 160 as potential redirection nodes. As node 1 140 is not operational, that leaves node N 170 as the node to put in the 'jvmRoute' field. Routing agent 165 of node 3 160 then sends the updated HTTP request back to the client 110 at time N+4.

When the load balancer 130 receives the new redirected HTTP request from the client 110, it then references the 'jvmRoute' field of the HTTP request and routes the request to node N 170 at time N+5. Once the HTTP request arrives at node N 170, session agent 172 of node N 170 determines that the request belongs at the node N 170 because the one or more other protocol sessions of the converged session are being hosted there. As a result, node N 170 sends a HTTP OK response back to the HTTP load balancer 130 at time N+6.

One skilled in the art will appreciate that in some embodiments of the invention, the 'jvmRoute' field and 'rejectedBy' (hints) field are sent in a different format than a cookie, for instance, as parameters of an HTTP GET request associated with the HTTP request.

Figure 3:
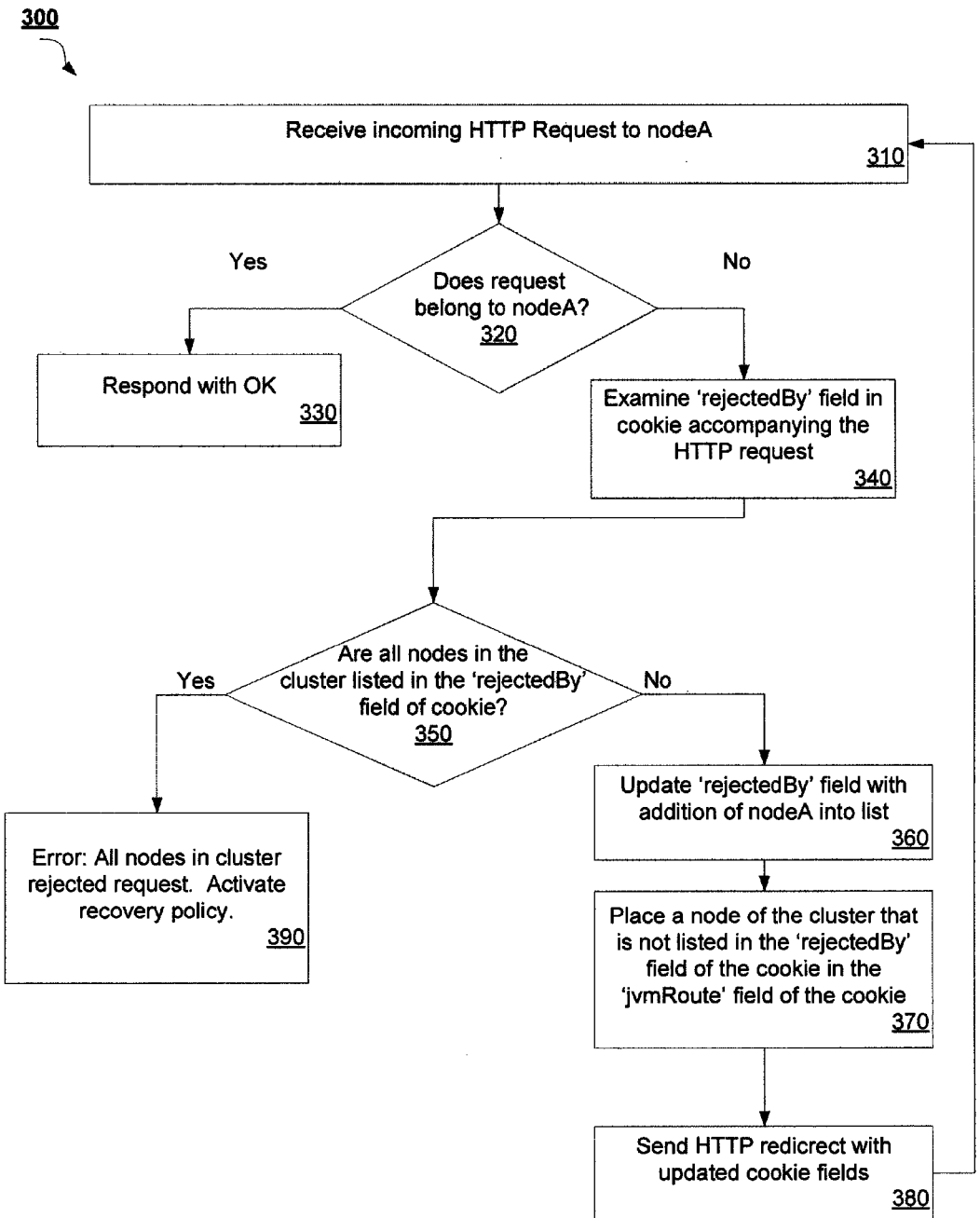
FIG. 3 is a flow diagram illustrating a method performed by a server node for cooperative load balancing with HTTP in converged telecommunication services according to an embodiment of the invention.

FIG. 3 is a flow diagram illustrating a method 300 performed by a server node for cooperative load balancing with HTTP in converged telecommunication services according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by server nodes 140-170 of FIG. 1.

Method 300 begins at block 310 where an incoming HTTP request is received at node A. In one embodiment, the HTTP request is part of a converged telecommunications application whose session was previously hosted at a node that has failed over. Then, at decision block 320, it is determined whether the request belongs to node A. Each node in a cluster will include logic that determines whether a request is associated with any other protocol sessions being served at that node. If the request does belong to node A, then the node responds with an OK at block 330. However, if the request does not belong to the node, then the node examines a 'rejectedBy' field in a cookie that accompanies the request at block 340.

At decision block 250, it is determine whether all of the nodes in the cluster of node A are listed in the 'rejectedBy' field of the cookie. If so, then an error has occurred as all nodes in the cluster have rejected the request and a recovery policy is active at block 390. On the other hand, if all nodes are not listed in the 'rejectedBy' field, then at block 360 the 'rejectedBy' field is updated with the identifying information of node A. At block 270, another node is put into a 'jvmRoute' field of the cookie in the request. The selection of this node is determined based on the nodes listed in the 'rejectedBy' field, and any active/operational node of the cluster that is not listed in this field may be put in the 'jvmRoute' field. At block 380, the updated HTTP request is sent as a redirection request with its updated cookie fields back to the client. Method 300 then continues at block 310 where new HTTP request, based on the redirected HTTP request, is received at another node "A".

Method 300 continues until either the correct node hosting the other protocol sessions of the converged application are found (block 330) or there is an error and all nodes in the cluster have rejected the request (block 390).

One skilled in the art will appreciate that in some embodiments of the invention, the 'jvmRoute' field and 'rejectedBy' (hints) field are sent in a different format than a cookie, for instance, as parameters of an HTTP GET request associated with the HTTP request.

FIG. 4 is a flow diagram illustrating a method 400 for cooperative load balancing with HTTP in converged telecommunication services according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by HTTP load balancer 130 of FIG. 1.

Method 400 begins at block 410 where an incoming HTTP request is received at an HTTP load balancer from a client. In one embodiment, the request originates from a web browser application running on the client. In further embodiments, the HTTP request is part of a converged telecommunications application whose session was previously hosted at a node that has failed over. Then, at block 420, a node to route the HTTP request is determined by referencing a route field in a cookie of the request. In one embodiment, the route field is identified as a 'jvmRoute' field. The HTTP request is then routed to the determined node at block 430.

Subsequently, at block 440, a redirected form of the same HTTP request is received from the client. In one embodiment, this redirected HTTP request includes a hints field in the cookie that is updated to list any nodes that have rejected the HTTP request. At block 450, a node to route the HTTP request by referencing the route field in the cookie of the request. Upon rejection by the previously-routed to node, the node updated this route field to another node that was not listed in the hints field of the cookie. Lastly, at block 460, the redirected HTTP request is routed to the node determined in block 450. In some embodiments, method 400 continues until a correct node to host the HTTP request is found or all nodes in a cluster of the nodes have been tried per the hints field of the cookie of the HTTP request.

One skilled in the art will appreciate that in some embodiments of the invention, the 'jvmRoute' field and 'rejectedBy' (hints) field are sent in a different format than a cookie, for instance, as parameters of an HTTP GET request associated with the HTTP request.

Figure 5:
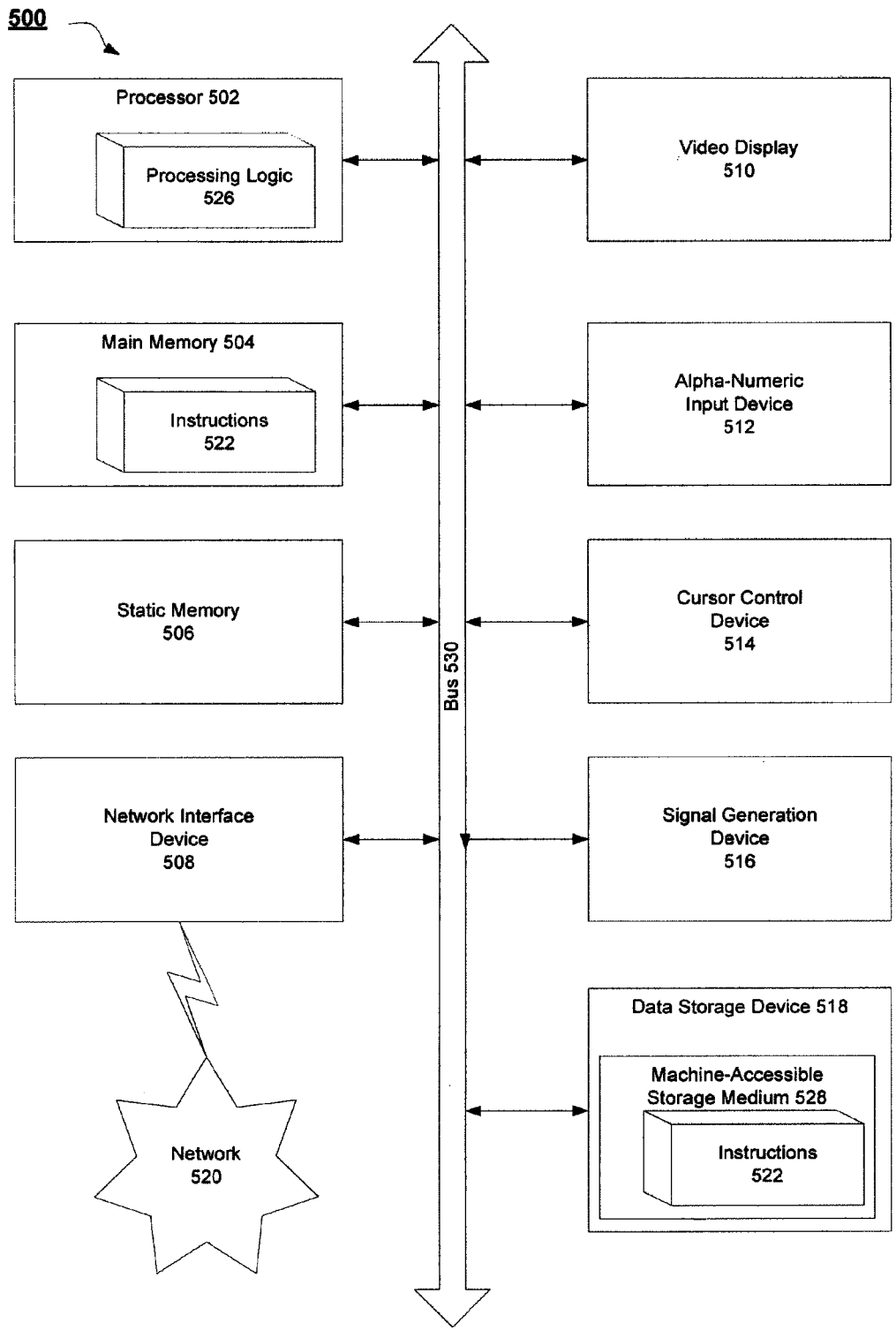
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform cooperative load balancing with HTTP in converged telecommunication services by telecommunications cluster 120 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform method 300 for cooperative load balancing with HTTP in converged telecommunication services described with respect to FIG. 3, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method for providing cooperative load balancing in converged telecommunication services, comprising:
   receiving, by a server machine node of a cluster of server machine nodes, an incoming HyperText Transport Protocol (HTTP) request comprising a hints field and a route field;
   determining, by the server machine node, that the HTTP request does not belong to the server machine node, wherein based on the determining, the server machine node rejects the HTTP request;
   updating, by the server machine node, the hints field of the HTTP request with identifying information of the server machine node by adding the identifying information of the server to the hints field;
   selecting, by the server machine node, another server machine node of the cluster of server machine nodes based on the server machine node not being listed in the hints field;
   placing, by the server machine node, an identifier of the selected another server machine node in the route field of the HTTP request; and
   sending, by the server machine node, a redirection response with the updated hints and updated route fields to a client machine,
      wherein the hints field maintains a listing of each server machine node of the cluster of server machine nodes that have previously rejected the HTTP request, and
      wherein the route field is used by a load balancer of the cluster of server machines to forward messages received from the client to the server identified by the route field.

2. The method of claim 1, wherein the server machine node receives the incoming HTTP request from an HTTP load balancer of the cluster.

3. The method of claim 2, wherein the client machine sends a new HTTP request with the updated hints field and the updated route field in the cookie to the load balancer for routing to the another server machine node by referencing the route field.

4. The method of claim 3, wherein if the another server machine node determines that the HTTP request belongs at the another server machine node, then sending an HTTP OK response by the another server machine node to the client.

5. The method of claim 1, wherein determining that the HTTP request does not belong to the server machine node further includes determining that one or more other protocol sessions of a converged application session of the HTTP request are not hosted by the server machine node.

6. The method of claim 5, wherein the one or more other protocol sessions include at least one of Session Initiation Protocol (SIP), Extensible Messaging and Presence Protocol (XMPP), Short Messaging Peer-to-Peer Protocol (SMPP), Diameter, Real-time Transport Protocol (RTP), and Signaling System #7 (SS7) protocols.

7. The method of claim 1, wherein the incoming HTTP request is the result of a failover of a converged telecommunication session at a failed server machine node of the cluster of server machine node, wherein the converged telecommunication session includes an HTTP session of the HTTP request.

8. The method of claim 1, wherein the hints field and the route field are part of at least one of a cookie of the HTTP request or a HTTP GET parameters associated with the HTTP request.

9. A server machine node of a cluster of server machine nodes, comprising:
   a memory;
   a processing device communicably coupled to the memory;
   a session agent executable from the memory by the processing device, the session agent configured to:
      receive an incoming HyperText Transport Protocol (HTTP) request comprising a hints field and a route field;
      determine that the HTTP request does not belong to the server machine node, wherein based on the determining, the server machine node rejects the HTTP request; and
      update the hints field of the HTTP request with identifying information of the server machine node by adding the identifying information of the server to the hints field; and
   a routing agent executable from the memory by the processing device and communicably coupled to the session agent, the routing agent operable to:
      select another server machine node of the cluster of server machine nodes based on the server machine node not being listed in the hints field;
      place an identifier of the selected another server machine node in the route field of the HTTP request; and
      send a redirection response with the updated hints and updated route fields to a client machine,
         wherein the hints field maintains a listing of each server machine node of the cluster of server machine nodes that have previously rejected the HTTP request, and
         wherein the route field is used by a load balancer of the cluster of server machines to forward messages received from the client to the server identified by the route field.

10. The system of claim 9, wherein the incoming HTTP request is received from an HTTP load balancer of the cluster of server machine nodes and wherein the client machine sends a new HTTP request with the updated hints field and the updated route field in the cookie to the HTTP load balancer for routing to the another server machine node by referencing the route field.

11. The system of claim 10, wherein if the another server machine node determines that the HTTP request belongs at the another server machine node, then sending an HTTP OK response by the another server machine node to the client.

12. The system of claim 9, wherein determining that the HTTP request does not belong to the server machine node further includes determining that one or more other protocol sessions of a converged application session of the HTTP request are not hosted by the server machine node.

13. The system of claim 12, wherein the one or more other protocol sessions include at least one of Session Initiation Protocol (SIP), Extensible Messaging and Presence Protocol (XMPP), Short Messaging Peer-to-Peer Protocol (SMPP), Diameter, Real-time Transport Protocol (RTP), and Signaling System #7 (SS7) protocols.

14. The system of claim 9, wherein the incoming HTTP request is the result of a failover of a converged telecommunication session at a failed server machine node of the cluster of server machine node, wherein the converged telecommunication session includes an HTTP session of the HTTP request.

15. The system of claim 9, wherein the hints field and the route field are part of at least one of a cookie of the HTTP request or a HTTP GET parameters associated with the HTTP request.

16. A non-transitory machine-readable storage medium including data that, when accessed by a machine, cause the machine to perform operations for providing cooperative load balancing in converged telecommunication services comprising:
    receiving, by a server machine node of a cluster of server machine nodes, an incoming HyperText Transport Protocol (HTTP) request comprising a hints field and a route field;
    determining, by the server machine node, that the HTTP request does not belong to the server machine node, wherein based on the determining, the server machine node rejects the HTTP request;
    updating, by the server machine node, the hints field of the HTTP request with identifying information of the server machine node by adding the identifying information of the server to the hints field;
    selecting, by the server machine node, another server machine node of the cluster of server machine nodes based on the server machine node not being listed in the hints field;
    placing, by the server machine node, an identifier of the selected another server machine node in the route field of the HTTP request; and
    sending, by the server machine node, a redirection response with the updated hints and updated route fields to a client machine,
        wherein the hints field maintains a listing of each server machine node of the cluster of server machine nodes that have previously rejected the HTTP request, and
        wherein the route field is used by a load balancer of the cluster of server machines to forward messages received from the client to the server identified by the route field.

17. The non-transitory machine-readable storage medium of claim 16, wherein the server machine node receives the incoming HTTP request from an HTTP load balancer of the cluster and wherein the client machine sends a new HTTP request with the updated hints field and the updated route field in the cookie to the load balancer for routing to the another server machine node by referencing the route field.

18. The non-transitory machine-readable storage medium of claim 16, wherein determining that the HTTP request does not belong to the server machine node further includes determining that one or more other protocol sessions of a converged application session of the HTTP request are not hosted by the server machine node.

19. The non-transitory machine-readable storage medium of claim 18, wherein the one or more other protocol sessions include at least one of Session Initiation Protocol (SIP), Extensible Messaging and Presence Protocol (XMPP), Short Messaging Peer-to-Peer Protocol (SMPP), Diameter, Real-time Transport Protocol (RTP), and Signaling System #7 (SS7) protocols.

20. The non-transitory machine-readable storage medium of claim 18, wherein the hints field and the route field are part of at least one of a cookie of the HTTP request or a HTTP GET parameters associated with the HTTP request.

* * * * *